United States Patent
Wegmann et al.

(10) Patent No.: US 12,388,151 B2
(45) Date of Patent: Aug. 12, 2025

(54) BATTERY PACK, WORK SYSTEM AND METHOD FOR PRODUCING A BATTERY PACK

(71) Applicant: Andreas Stihl AG & Co. KG, Waiblingen (DE)

(72) Inventors: Raphael Wegmann, Leonberg (DE); Daniel Amann, Stuttgart (DE); Thilo Jaeger, Kernen (DE); Patrick Behringer, Ostfildern (DE); Siegfried Frey, Stuttgart (DE); Danny Knapp, Fellbach (DE); Marcel Wilka, Boebingen (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 42 days.

(21) Appl. No.: 17/450,499

(22) Filed: Oct. 11, 2021

(65) Prior Publication Data
US 2022/0115735 A1    Apr. 14, 2022

(30) Foreign Application Priority Data
Oct. 12, 2020    (EP) .................................... 20201296

(51) Int. Cl.
*H01M 50/317* (2021.01)
*H01M 50/147* (2021.01)
(Continued)

(52) U.S. Cl.
CPC ....... *H01M 50/317* (2021.01); *H01M 50/147* (2021.01); *H01M 50/213* (2021.01);
(Continued)

(58) Field of Classification Search
CPC ............. H01M 50/317; H01M 50/543; H01M 50/213; H01M 50/147; H01M 2200/20; H01M 2220/30
See application file for complete search history.

(56) References Cited

U.S. PATENT DOCUMENTS

| | | | |
|---|---|---|---|
| 2011/0171507 A1* | 7/2011 | Kim ................. | H01M 10/0431 429/185 |
| 2013/0095356 A1 | 4/2013 | Shimizu et al. | |

(Continued)

FOREIGN PATENT DOCUMENTS

| | | | |
|---|---|---|---|
| DE | 102011078301 A1 * | 1/2013 | .......... H01M 2/1229 |
| DE | 10 2013 205 640 A1 | 10/2014 | |

OTHER PUBLICATIONS

German-language Extended European Search Report issued in European Application No. 20201296.9 dated Mar. 29, 2021 (nine (9) pages).

*Primary Examiner* — Brian R Ohara
*Assistant Examiner* — Emily Elizabeth Freeman
(74) *Attorney, Agent, or Firm* — Crowell & Moring LLP

(57) ABSTRACT

A battery pack supplies an electrically driven work appliance with electrical drive power. The battery pack has: at least one battery cell, wherein the battery cell has at least one safety device, at least one voltage-carrying surface, an insulating lacquer, wherein the insulating lacquer adheres on the voltage-carrying surface, and at least one cover element. The at least one cover element covers the safety device such that no insulating lacquer adheres on and/or in the safety device.

15 Claims, 4 Drawing Sheets

(51) Int. Cl.
*H01M 50/213* (2021.01)
*H01M 50/543* (2021.01)

(52) U.S. Cl.
CPC ...... *H01M 50/543* (2021.01); *H01M 2200/20* (2013.01); *H01M 2220/30* (2013.01)

(56) References Cited

U.S. PATENT DOCUMENTS

| | | | |
|---|---|---|---|
| 2014/0295223 A1 | 10/2014 | Gendlin et al. | |
| 2014/0302358 A1* | 10/2014 | Kim | H01M 50/184 |
| | | | 429/53 |
| 2014/0315050 A1* | 10/2014 | Li | H01M 50/342 |
| | | | 429/56 |
| 2016/0329549 A1* | 11/2016 | Chatroux | H01M 50/571 |
| 2018/0053974 A1* | 2/2018 | Lee | H01M 50/147 |
| 2022/0393251 A1* | 12/2022 | Yun | H01M 50/533 |

\* cited by examiner

BATTERY PACK, WORK SYSTEM AND METHOD FOR PRODUCING A BATTERY PACK

CROSS REFERENCE TO RELATED APPLICATION

This application claims priority under 35 U.S.C. § 119 from European Patent Application No. 20201296.9, filed Oct. 12, 2020, the entire disclosure of which is herein expressly incorporated by reference.

BACKGROUND AND SUMMARY OF THE INVENTION

The invention relates to a battery pack for supplying an electrically driven work appliance with electrical drive power, to a work system having such a battery pack and an electrically driven work appliance, and to a method for producing a battery pack for supplying an electrically driven work appliance with electrical drive power.

The problem addressed by the invention is that of providing a battery pack for supplying an electrically driven work appliance with electrical drive power, providing a work system having such a battery pack and an electrically driven work appliance, and providing a method for producing a battery pack for supplying an electrically driven work appliance with electrical drive power, wherein the battery pack and thus the work system and the method each have improved characteristics.

The invention achieves the object through the provision of a battery pack, a work system, and a method according to the independent claims. Advantageous developments and/or refinements of the invention are described in the dependent claims.

The battery pack according to the invention is designed or configured for, in particular automatically, supplying an electrically driven work appliance, in particular a gardening, forestry and/or construction work appliance, or electrical tool, with electrical drive power. The battery pack comprises or has at least one battery cell, at least one voltage-carrying surface, an insulating lacquer and at least one cover element. The battery cell comprises or has at least one safety device. The insulating lacquer adheres, in particular directly, on the voltage-carrying surface. The at least one cover element, in particular directly, covers the safety device, in particular completely, such that, in particular at a time directly after production of the battery pack, no insulating lacquer firmly adheres on and/or in the safety device.

The safety device makes it possible, in the event of an overshooting of an operating threshold of the battery cell, for resulting damage to be minimized or even avoided entirely.

The cover element, or the fact that no insulating lacquer firmly adheres on and/or in the safety device, allows correct functioning or action of the safety device. In particular, in the event, which in particular does not conform to the invention, of insulating lacquer firmly adhering on and/or in the safety device, said insulating lacquer could prevent correct functioning of the safety device.

Furthermore, the cover element allows the insulating lacquer to be applied on the voltage-carrying surface without, in particular a great deal of, attention having to be paid to the covered safety device. This thus allows simple and uncomplicated and thus inexpensive production of the battery pack.

The insulating lacquer makes it possible to avoid electrical insulation of the voltage-carrying surface and thus unintended or undesired, in particular electrical, contacting, in particular physical contact, of the voltage-carrying surface. This thus makes it possible to avoid resulting damage.

In particular, the battery pack, in particular the at least one battery cell, may have a maximum electrical drive power of at least 10 watts (W), in particular of at least 100 W, in particular of at least 1 kilowatts (kW), in particular of at least 2 kW, and/or of at most 10 kW, in particular of at most 5 kW, in particular of at most 3 kW. Additionally or alternatively, the battery pack, in particular the at least one battery cell, may have a nominal voltage of at least 1 volt (V), in particular of at least 2 V, in particular of at least 5 V, in particular of at least 10 V, in particular of at least 20 V, and/or of at most 100 V, in particular of at most 50 V, in particular of 36 V. Further additionally or alternatively, the battery pack, in particular the at least one battery cell, may have an in particular electrical maximum energy content of at least 100 watt hours (Wh), in particular of at least 200 Wh, and/or of at most 4000 Wh, in particular of at most 2000 Wh, in particular of at most 1000 Wh, in particular of at most 500 Wh, in particular of 337 Wh.

The at least one battery cell may be designed for supplying the work appliance with drive power. Additionally or alternatively, the battery cell may have an, in particular electrical, maximum energy content of at least 6 Wh and/or of at most 360 Wh. In particular, the battery cell may have a maximum energy content of 6.5 ampere hours multiplied by 3.6 volts=23.4 Wh. Further additionally or alternatively, the battery cell may be an electrochemical-based individually rechargeable storage element for electrical energy. Further additionally or alternatively, the battery cell may be a lithium-ion battery cell.

The insulating lacquer may, in particular completely, cover the voltage-carrying surface. Additionally or alternatively, the insulating lacquer may be in a solid, in particular cured, state. Further additionally or alternatively, a thickness of the insulating lacquer, in particular a value of the thickness, may be at least 0.1 micrometres (μm) and/or at most 1000 μm.

The cover element may differ from the insulating lacquer. In particular, the cover element need not or may not have any lacquer, in particular need not or may not be lacquer. Additionally or alternatively, the cover element may be applied on the battery cell.

In one refinement of the invention, the battery cell comprises or has at least one cell contact or one cell terminal or one cell pole. The cell contact comprises or has the voltage-carrying surface. Additionally or alternatively, the battery pack comprises or has at least one cell contactor. The cell contactor comprises or has the voltage-carrying surface. Further additionally or alternatively, the battery pack comprises or has a pack electronics unit, in particular a measurement, power, user interface and/or transmission electronics unit. The pack electronics unit comprises or has the voltage-carrying surface. Further additionally or alternatively, the battery pack comprises or has at least one pack contact connector. The pack contact connector comprises or has the voltage-carrying surface. This makes it possible, in particular the cell contact, cell contactor, the pack electronics unit and/or the pack contact connector make(s) it possible, for an electrical current to be conducted. In particular, the cell contact may be a plus contact or a positive cell contact. Additionally or alternatively, the cell contact and the cell contactor may make, in particular direct and/or electrical, contact, in particular physical contact. Further additionally or alternatively, the cell contact or the cell contactor and the pack electronics unit may make, in particular direct and/or electrical, contact, in particular physical contact. In particular, the cell contactor may electrically connect the cell contact to a further cell contact of a further battery cell of the battery pack and/or of the pack electronics unit. Further additionally or alternatively, the cell contact or the cell contactor or the pack electronics unit and the pack contact connector may make, in particular direct and/or electrical, contact, in particular physical contact. Further additionally or alternatively, the pack contact connector may be designed for making, in particular direct and/or electrical, contact, in particular physical contact, with an appliance contact connector of the work appliance. In particular, the pack contact connector may be designed for electrically connecting the cell contact, the cell contactor or the pack electronics unit to the appliance contact connector. Further additionally or alternatively, the measurement electronics unit may be designed for, in particular automatically, measuring a characteristic, in particular a voltage, of the battery cell. This can make it possible for safety-critical states of the battery cell to be detected. Further additionally or alternatively, the power electronics may be designed for in particular automatically controlling, in particular ending, an outputting of the electrical drive power from the battery pack and/or an intake of electrical charge power by the battery pack, in particular in a manner dependent on the measured characteristic. This can make it possible for a safety-critical state of the battery cell and thus of the battery pack to be minimized or even avoided entirely. Further additionally or alternatively, the user interface electronics unit may be designed for in particular automatically interacting with a user, in particular for the purposes of outputting a state of charge of the battery pack. Further additionally or alternatively, the transmission electronics unit may be designed for in particular automatic wireless transmission of at least one operating parameter and/or operating state.

In one refinement of the invention, the safety device comprises or has a safety valve and/or a current interrupt device (CID), and in particular the safety device is the safety valve and/or the current interrupt device. The safety valve makes it possible, in the event of an overshooting of an operating threshold pressure of the battery cell, for resulting damage to be minimized or even avoided entirely. Additionally or alternatively, the current interrupt device makes it possible, in the event of an overshooting of the operating threshold, in particular of the operating threshold pressure of the battery cell, for a flow of a current to be interrupted, and thus for resulting damage to be minimized or even avoided entirely.

In one refinement of the invention, the safety device, in particular having the safety valve, comprises or has at least one gas escape opening. The at least one cover element, in particular directly, covers the at least one gas escape opening, in particular completely, in particular at a time directly after production of the battery pack. Additionally or alternatively, the safety device, in particular having the safety valve and/or the current interrupt device, comprises or has at least one predetermined breaking point. The at least one cover element covers the at least one predetermined breaking point, in particular completely, in particular at a time directly after production of the battery pack. The gas escape opening allows an escape or a discharge of off-gas from the inside of or within the battery cell to the outside of the battery cell, in particular if a pressure of off-gas generated by an electrochemical reaction taking place in or within the battery cell overshoots an operating threshold pressure. Additionally or alternatively, the, in particular broken, predetermined breaking point allows the escape of off-gas from the inside to the outside, in particular if the pressure overshoots the operating threshold pressure, and in particular thus breaks the predetermined breaking point. Further additionally or alternatively, the, in particular broken, predetermined breaking point allows an interruption of a flow of a current, in particular if the pressure overshoots the operating threshold pressure, and in particular thus breaks the predetermined breaking point. The cover element, with the fact that no insulating lacquer firmly adheres on and/or in the safety device, makes possible a free gas escape opening, or a gas escape opening which is not blocked by insulating lacquer, and/or the allowance of breakage of the predetermined breaking point. In particular, in the event, which in particular does not conform to the invention, of insulating lacquer firmly adhering on and/or in the safety device, said insulating lacquer could block the gas escape opening and/or prevent, in particular block, a breakage of the predetermined breaking point. In particular, the unbroken or intact predetermined breaking point may be designed to prevent an escape of off-gas from the inside to the outside and/or to allow the flow of the current.

In one refinement of the invention, the battery cell is an, in particular elongate, round cell. The safety device is arranged at a face side of the round cell. The at least one cover element has an, in particular closed, ring shape. This allows the safety device to be covered by means of the at least one cover element. In particular, the safety device, in particular having the at least one gas escape opening, may, at the face side, have an in particular corresponding ring shape. Additionally or alternatively, this allows contacting of the cell contact, if arranged at the face side in a centre of the side, through a free ring centre of the cover element. In particular, a length of the round cell may be greater than a diameter of the round cell.

In one refinement of the invention, the cover is applied in at least one shape-bearing layer. This allows the cover element to be applied without, in particular a great deal of, attention having to be paid to the safety device. In particular, the insulating lacquer can be applied in shapeless form.

In one refinement of the invention, the cover element is impermeable to the insulating lacquer, in particular in a liquid, in particular non-cured, state. This makes it possible to avoid the insulating lacquer running through the cover element.

In one embodiment of the invention, the cover element consists partially or entirely of polyethylene terephthalate (PET).

In one refinement of the invention, the cover element is firmly adhesively bonded, in particular firmly adheres, on the battery cell, in particular at a time directly after production of the battery pack. This allows the safety device to be reliably covered by means of the at least one cover element.

In one embodiment of the invention, the cover element is firmly adhesively bonded to the battery cell by means of an adhesive, in particular a pressure-sensitive adhesive. The adhesive is partially or entirely an acrylate adhesive, or consists partially or entirely of acrylate adhesive.

In one embodiment of the invention, an adhesive force, in particular a value of the adhesive force, per unit area, in particular value of the area, between the cover element and the battery cell is at most 1000 newtons per square metre ($N/m^2$) and/or at least 0.1 $N/m^2$. This, in particular the maximum value, allows an intended or desired release of the cover element from the battery cell, in particular caused by a pressure equalization from the inside of or within the battery cell outwards, or to the outside of the battery cell. Additionally or alternatively, this, in particular the minimum value, makes it possible to avoid an unintended or undesired release of the cover element from the battery cell. The, in particular intended or desired, release of the cover element from the battery cell allows correct functioning or action of the safety device, in particular having the at least one gas escape opening and/or the at least one predetermined breaking point. In particular, in the event, which in particular does not conform to the invention, of a non-release of the cover element from the battery cell, said cover element could prevent correct functioning of the safety device, in particular could close the gas escape opening and/or prevent, in particular block, a breakage of the predetermined breaking point.

In one embodiment of the invention, the cover element is self-adhesive. This allows easy and uncomplicated application of the cover element. In particular, the cover element may have, in particular be, an in particular functional carrier, in particular a carrier substance or material, and the adhesive, wherein the carrier may, in particular on one side, be coated with the adhesive.

In one refinement of the invention, the insulating lacquer is applied on the voltage-carrying surface by dipping of the voltage-carrying surface into the insulating lacquer. Additionally or alternatively, the insulating lacquer may be a dipping lacquer.

The work system according to the invention, in particular gardening, forestry and/or construction work system, or electrical tool system, comprises or has a, in particular the, battery pack as described above and an electrically driven, in particular the electrically driven, work appliance. The battery pack and the work appliance are designed or configured for electrical connection to one another for the purposes of in particular automatically supplying the work appliance with electrical drive power from the battery pack.

In particular, the work appliance may be a hand-guided, in particular ground-guided or hand-held work appliance. Hand-guided, in particular hand-held work appliance may in particular mean that the work appliance may have a mass of at most 50 kilograms (kg), in particular of at most 20 kg, in particular of at most 10 kg, in particular of at most 5 kg, and/or of at least 1 kg, in particular of at least 2 kg. Additionally or alternatively, the work appliance may have an electric drive motor. Further additionally or alternatively, the battery pack and the work appliance may be designed for electrical connection to one another in a manner releasable in particular without the use of tools and/or non-destructively, in particular by means of plug connectors. Further additionally or alternatively, the battery pack and the work appliance may be designed for mechanical connection to one another in a manner releasable in particular without the use of tools and/or non-destructively. In particular, the work appliance may be designed for carrying the battery pack. In particular, the work appliance may have a battery receptacle, in particular battery slot, wherein the battery receptacle may be designed for receiving the battery pack. Alternatively, the battery pack may be integrated into the work appliance. Further additionally or alternatively, the battery pack and the work appliance may be designed for electrical connection to one another by mutual contacting of the at least one pack contact connector and of the in particular at least one appliance contact connector.

In one refinement of the invention, the electrically driven work appliance is a saw, a pole pruner, a brushcutter, a hedge trimmer, a hedge cutter, a blower, a leaf blower, a pruner, a cut-off grinder, a sweeping appliance, a sweeping roller, a sweeping brush, a lawnmower, an aerator or a grass trimmer.

The method according to the invention is designed or configured or provided for the production or assembly of a, in particular the, battery pack, in particular as described above, for supplying a, in particular the, electrically driven work appliance with electrical drive power. The method comprises or has the steps: a) Covering a, in particular the, safety device of a, in particular the, battery cell, in particular of the battery pack, by means of at least one, in particular the at least one, cover element, in particular of the battery pack. b) Dipping at least one, in particular the at least one, voltage-carrying surface, in particular of the battery pack, and in particular the battery cell with the at least one cover element, into a, in particular the, insulating lacquer, in particular of the battery pack and/or in the liquid state, such that the insulating lacquer firmly adheres on the voltage-carrying surface. The covering in step a) is performed or carried out such that no insulating lacquer firmly adheres on and/or in the safety device as a result of step b).

The method may allow the same advantages as the battery pack described above.

In particular, step b) may be carried out at a time after step a). Additionally or alternatively, the method may comprise, in particular at a time after step b): curing the insulating lacquer into the solid state.

Further advantages and aspects of the invention arise from the claims and from the following description of preferred exemplary embodiments of the invention, which are explained below on the basis of the figures.

DETAILED DESCRIPTION OF THE DRAWINGS

Figure 1:
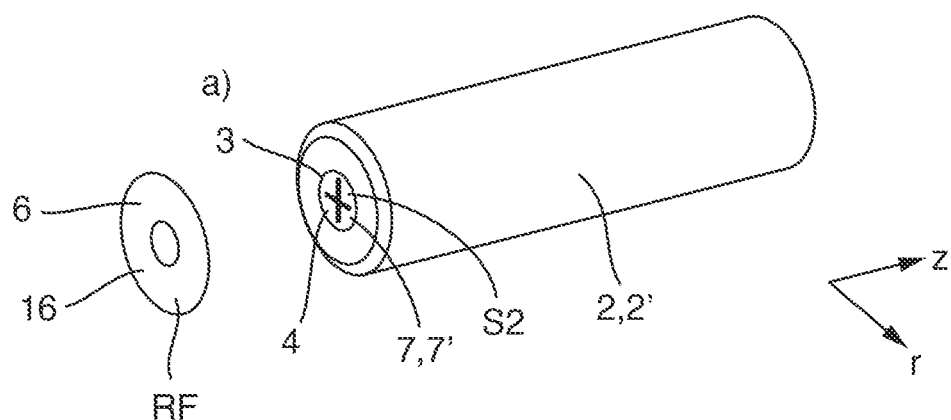
FIG. 1 shows a perspective view of the covering of a safety device of a battery cell by means of a cover element in a method according to an embodiment of the invention for producing a battery pack according to an embodiment of the invention.
Figure 2:
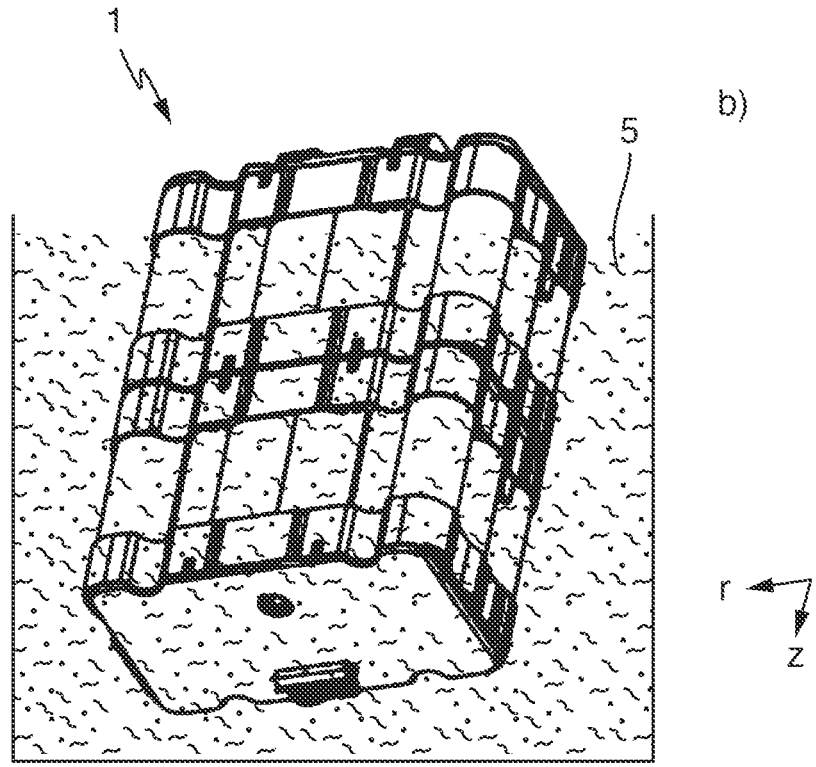
FIG. 2 shows a perspective view of the dipping of at least one voltage-carrying surface into an insulating lacquer in the method for producing the battery pack.
Figure 7:
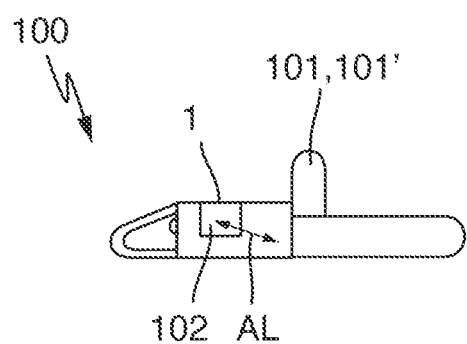
FIG. 7 shows a schematic view of a work system according to an embodiment of the invention having the battery pack and an electrically driven work appliance.

FIGS. 1 and 2 show a method for producing a battery pack 1 for supplying an electrically driven work appliance 101 with electrical drive power AL, as shown in FIG. 7. The method has the steps: a) covering a safety device 3 of a battery cell 2 by means of at least one cover element 6, in the exemplary embodiment shown only a single cover element 6; and b) dipping at least one voltage-carrying surface 4, and in particular the battery cell 2 with the at least one cover element 6, into an insulating lacquer 5, in particular in a liquid state LS, such that the insulating lacquer 5 firmly adheres on the voltage-carrying surface 4. The covering in step a) is performed such that no insulating lacquer 5 firmly adheres on and/or in the safety device 3 as a result of step b).

Figure 3:
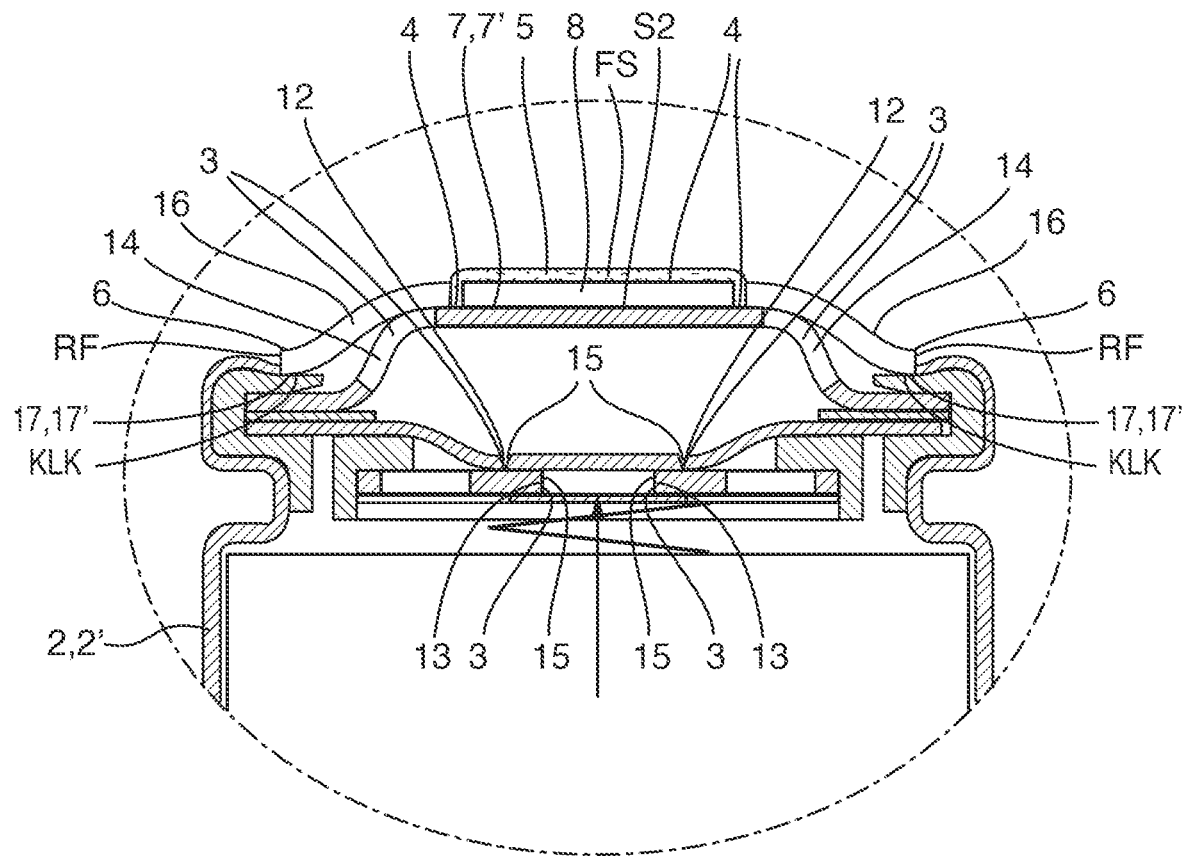
FIG. 3 shows a longitudinal sectional view of the battery cell having the safety device covered by means of the cover element and the insulating lacquer firmly adhered on the voltage-carrying surface, wherein no insulating lacquer firmly adheres on and/or in the safety device.
Figure 4:
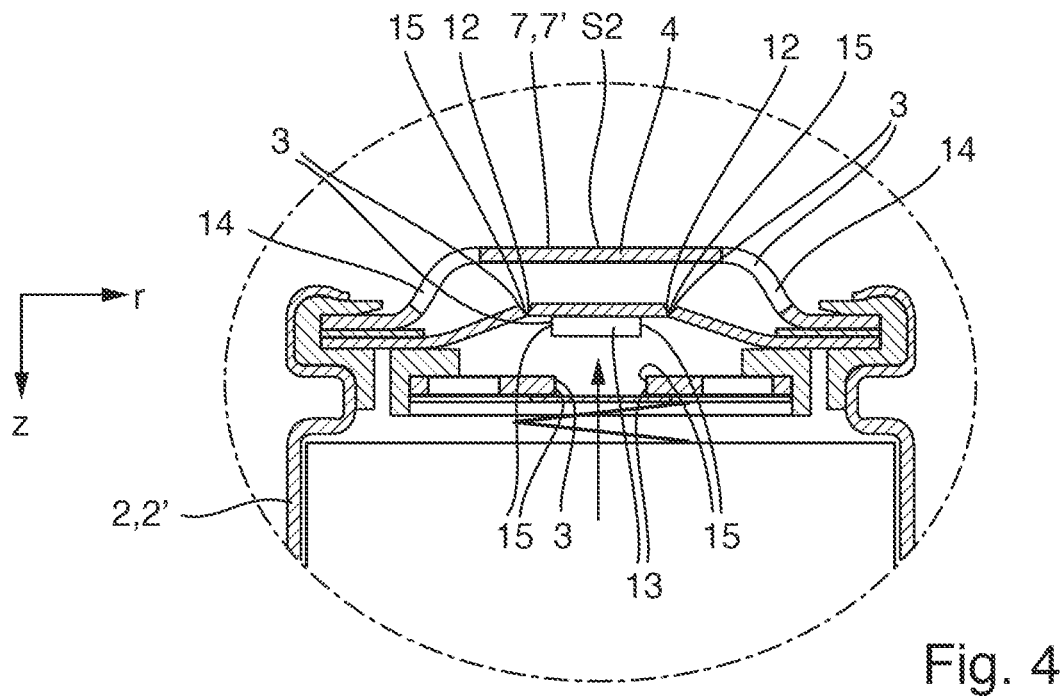
FIG. 4 shows a further longitudinal sectional view of the battery cell having the safety device having a current interrupt device and a predetermined breaking point upon the breakage of the predetermined breaking point or upon the interruption by the current interrupt device.
Figure 5:
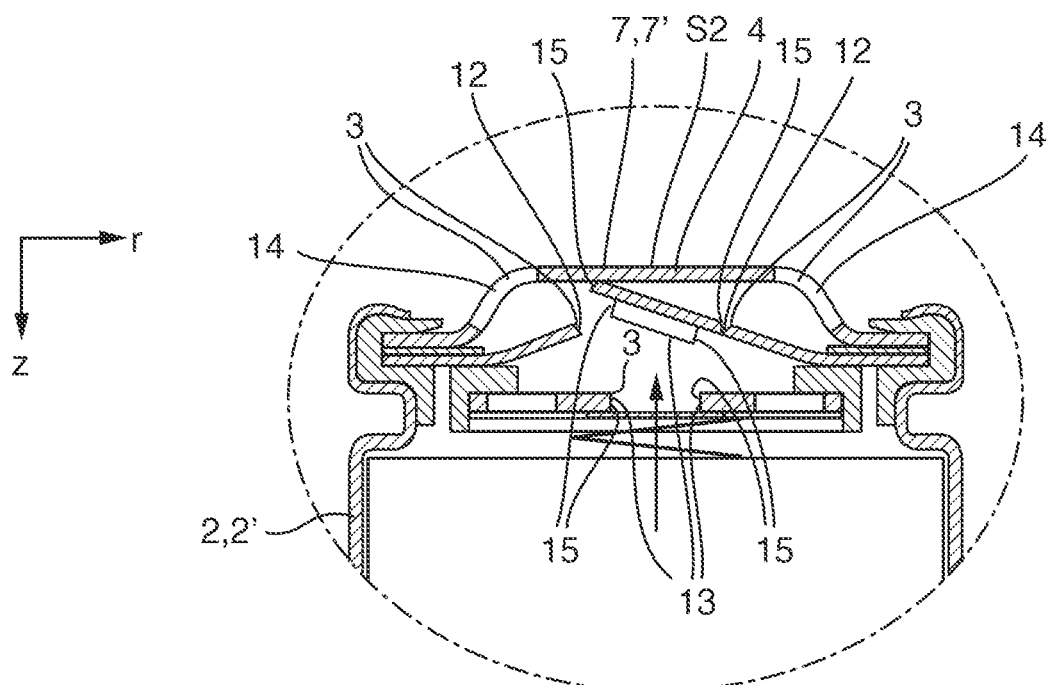
FIG. 5 shows a further longitudinal sectional view of the battery cell having the safety device having a safety valve, a gas escape opening and a predetermined breaking point upon the breakage of the predetermined breaking point and thus upon the escape of off-gas through the gas escape opening, or upon the opening of the safety valve.
Figure 6:
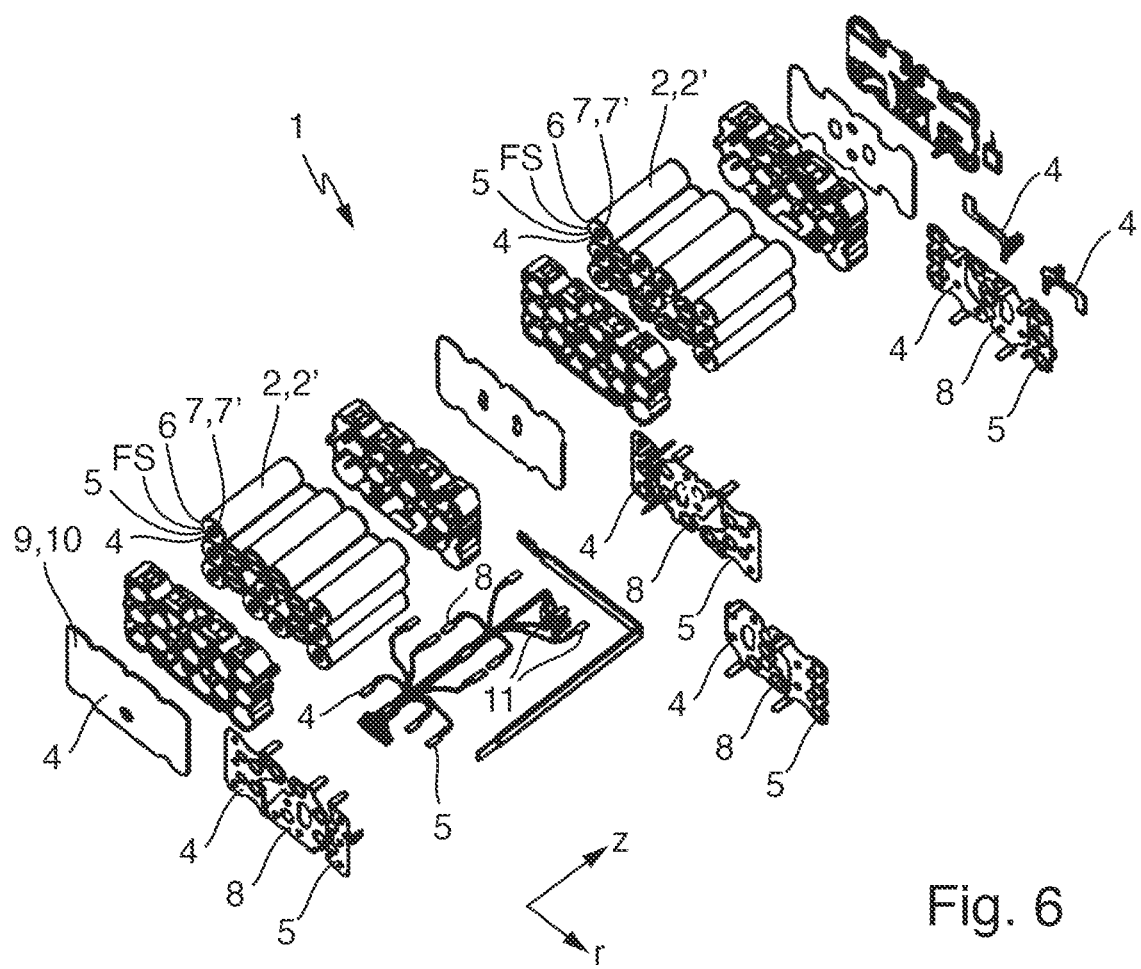
FIG. 6 shows an exploded view of the battery pack.

FIGS. 2, 6 and 7 show the battery pack 1 for supplying the work appliance 101 with electrical drive power AL. The battery pack 1 has the at least one battery cell 2, the at least one voltage-carrying surface 4, the insulating lacquer 5 and the at least one cover element 6. The battery cell 2 has the at least one safety device 3, as shown in FIGS. 3 to 5. The insulating lacquer 5, in particular in a solid state FS, adheres firmly on the voltage-carrying surface 4. The at least one cover element 6 covers the safety device 3 such that no insulating lacquer 5 adheres on and/or in the safety device 3.

In the exemplary embodiment shown, the battery pack 1 has thirty battery cells 2, which are in particular identical, in particular of the same type and/or construction. In alternative exemplary embodiments, the battery pack may have only a single battery cell or at least two, in particular at least five, in particular at least ten, battery cells.

Furthermore, in the exemplary shown, the battery cell 2 has only a single safety device 3. In alternative exemplary embodiments, the battery cell may have at least two safety devices.

Furthermore, in the exemplary embodiment shown, a number of cover elements 6 corresponds, in particular is equal to, a number of safety devices 3. In alternative exemplary embodiment, the number of cover elements need not or may not be equal, in particular correspond, to the number of safety devices, or may differ therefrom. In other words: In the exemplary embodiment shown, only a single cover element 6 covers a safety device 3. In alternative exemplary embodiments, at least two cover elements may cover a safety device.

In detail, the insulating lacquer 5 is applied on the voltage-carrying surface 4 by, in particular the, dipping of the voltage-carrying surface 4 into the insulating lacquer 5.

Furthermore, the battery cell 2 has at least one cell contact 7. The cell contact 7 has the voltage-carrying surface 4.

In the exemplary embodiment shown, the battery cell 2 has a further cell contact.

Additionally or alternatively, the battery pack 1 has at least one cell contactor 8. The cell contactor 8 has the voltage-carrying surface 4.

In the exemplary embodiment shown, the battery pack 1 has a multiplicity of cell contactors 8.

Further additionally or alternatively, the battery pack 1 has a pack electronics unit 9, in particular a measurement, power, user interface and/or transmission electronics unit 10. The pack electronics unit 9 has the voltage-carrying surface 4.

Further additionally or alternatively, the battery pack 1 has at least one pack contact connector 11. The pack contact connector 11 has the voltage-carrying surface 4.

In the exemplary embodiment shown, the battery pack 1 has a multiplicity of pack contact connectors 11.

Furthermore, the cell contact 7 and the cell contactor 8 make contact with one another.

Furthermore, the cell contactor 8 and the pack electronics unit 9 make contact with one another.

Furthermore, the pack electronics unit 9 and the pack contact connector 11 make contact with one another.

Furthermore, the battery cells 2 are electrically interconnected, in particular in parallel or series, in particular by means of the at least one cell contactor 8.

Furthermore, the cell contact 7 is a plus contact 7'.

Furthermore, the safety device 3 has a safety valve 12 and/or a current interrupt device 13.

Furthermore, the safety device 3 has at least one gas escape opening 14, in the exemplary embodiment shown two gas escape openings 14. The at least one cover element 6 covers the at least one gas escape opening 14, as shown in FIG. 3.

Additionally or alternatively, the safety device 3 comprises or has at least one predetermined breaking point 15, in the exemplary embodiment shown two types of predetermined breaking points 15. The at least one cover element 6 covers the at least one predetermined breaking point 15.

In the exemplary embodiment shown, a first type of the predetermined breaking points 15 corresponds to the current interrupt device 13.

If a pressure of off-gas generated by an electrochemical reaction taking place in or within the battery cell 2 overshoots an operating threshold pressure, the first type of the predetermined breaking points 15 breaks or the current interrupt device 13 interrupts owing to the pressure of off-gas, as shown in FIG. 4. In particular, off-gas pushes a part of the predetermined breaking point 15 or of the current interrupt device 13 outwards, or to the outside of the battery cell 2, as shown by an arrow.

Furthermore, a second type of the predetermined breaking points 15 corresponds to the safety valve 12.

If the pressure overshoots the operating threshold pressure, the second type of the predetermined breaking points 15 or the safety valve 12 opens owing to the pressure of off-gas, as shown in FIG. 5, in particular at a time after the breakage of the first type of the predetermined breaking points 15 or the interruption of the current interrupt device 13. In particular, off-gas pushes a part of the predetermined breaking point 15 or of the safety valve 12 outwards, or to the outside of the battery cell 2, as shown by an arrow.

Off-gas can thus escape from the inside to the outside, in particular through the at least one gas escape opening 14.

Furthermore, the battery cell 2 is an, in particular elongate, round cell 2'. The safety device 3 is arranged at a face side S2 of the round cell 2'. The at least one cover element 6 has an, in particular closed, ring shape RF.

In the exemplary embodiment shown, the safety device 3, in particular having the at least one gas escape opening 14, has, at the face side S2, an in particular corresponding ring shape.

Furthermore, the cell contact 7 is arranged at the face side S2 in a centre of the side.

Furthermore, the cell contact 7 and the cell contactor 8 make contact through a free ring centre of the cover element 6.

Furthermore, the further cell contact is arranged at a further face side, which is in particular situated opposite the face side S2.

Furthermore, the cover element 6 is applied in at least one shape-bearing layer 16.

Furthermore, the cover element 6 is impermeable to the insulating lacquer 5, in particular in the liquid state LS, and in particular the solid state FS.

In detail, the cover element 6 consists partially or entirely of PET.

Furthermore, the cover element 6 is firmly adhesively bonded, in particular firmly adheres, on the battery cell 2.

In detail, the cover element 6 is firmly adhesively bonded to the battery cell 2 by means of an adhesive 17, in particular a pressure-sensitive adhesive 17'. The adhesive 17 is partially or entirely an acrylate adhesive.

Furthermore, the cover element 6 is self-adhesive.

Furthermore, an adhesive force per unit area KLK between the cover element and the battery cell is at most 1000 N/m$^2$ and/or at least 1000 N/m$^2$.

The cover element 6 can thus be released in an intended or desired manner from the battery cell 2, in particular owing to a pressure equalization from the inside of the battery cell 2 to the outside of the battery cell 2, as shown in FIGS. 4 and 5. In other words: The cover element 6 or the label or the sticker detaches in the event of the first pressure equalization.

Off-gas can thus escape from the inside to the outside, in particular through the at least one gas escape opening 14, as described above.

In summary, the, in particular ring-shaped, cover element 6 or the label makes it possible that no liquids, in particular no insulating lacquer 5, can creep under the cover element 6 or the seal. This makes it possible for an ingress of the insulating lacquer 5 or of the lacquering into the current interrupt device 13 or the CID and/or the safety valve 2, or into the, in particular respective, region thereof, to be avoided. The safety behaviour of the battery cell 2 is thus not influenced. In other words: By means of the cover element 6, the entire core pack of the battery pack 1 can be lacquered (including the at least one battery cell 2), as shown in FIG. 2, without changing the safety characteristics of the battery cell 2, in particular without the safety-critical functions (opening pressure of the current interrupt device 13 or of the CID and/or of the safety valve 12) being influenced or even rendered inactive. By means of the insulating lacquer 5 or the lacquering and the resulting insulation of the battery pack 1, highly effective protection against environmental influences is possible.

FIG. 7 shows a work system 100. The work system 100 has the battery pack 1 and the electrically driven work appliance 101. The battery pack 1 and the work appliance 101 are designed for electrical connection, in particular are electrically connected, to one another, in particular by mutual contacting of the at least one pack contact connector 11 and at least one appliance contact connector of the work appliance 101, for the purposes of supplying the work appliance 101 with electrical drive power AL from the battery pack 1.

In detail, the work appliance 101 has a battery receptacle 102. The battery receptacle 102 is designed for receiving the battery pack 1, and the battery pack 1 is in particular received.

In the exemplary embodiment shown, the work appliance 101 is a saw 101'. In alternative exemplary embodiments, the work appliance may be a pole pruner, a brush cutter, a hedge trimmer, a hedge cutter, a blower, a leaf blower, a pruner, a cut-off grinder, a sweeping appliance, a sweeping roller, a sweeping brush, a lawnmower, an aerator or a grass trimmer.

As is made clear by the exemplary embodiments shown and discussed above, the invention provides a battery pack for supplying an electrically driven work appliance with electrical drive power, a work system having such a battery pack and an electrically driven work appliance, and a method for producing a battery pack for supplying an electrically driven work appliance with electrical drive power, wherein the battery pack and thus the work system and the method each have improved characteristics.

What is claimed is:

1. A battery pack for supplying an electrically driven work appliance with electrical drive power, comprising:
   at least one battery cell, wherein the battery cell has at least one safety device, and the at least one safety device comprises a safety valve and at least one gas escape opening;
   voltage-carrying surfaces of the battery pack;
   an insulating lacquer, wherein the insulating lacquer firmly adheres on a first of the voltage-carrying surfaces; and
   at least one cover element, wherein the at least one cover element completely covers the safety device including the at least one gas escape opening such that no insulating lacquer adheres on and/or in the safety device, wherein
   the battery cell is an elongate, round cell,
   the safety device is arranged at a face side of the round cell,
   the at least one cover element has a ring shape,
   the battery cell has at least one cell contact, wherein the cell contact has the first voltage-carrying surface,
   the battery pack has at least one cell contactor, wherein the cell contactor has a second voltage-carrying surface, and,
   the cell contact and the cell contactor make contact through a free ring center of the at least one cover element.

2. The battery pack according to claim 1, wherein at least one of:
   the battery pack has a pack electronics unit, wherein the pack electronics unit has one of the voltage-carrying surfaces, or
   the battery pack has at least one pack contact connector, wherein the pack contact connector has one of the voltage-carrying surfaces.

3. The battery pack according to claim 1,
wherein the safety device has a current interrupt device.

4. The battery pack according to claim 1,
wherein the safety device has at least one predetermined breaking point, and wherein the at least one cover element covers the at least one predetermined breaking point.

5. The battery pack according to claim 1,
wherein the at least one cover element is applied in at least one shape-bearing layer.

6. The battery pack according to claim 1,
wherein the at least one cover element is impermeable to the insulating lacquer in a liquid state.

7. The battery pack according to claim 6,
wherein the at least one cover element consists essentially of polyethylene terephthalate (PET).

8. The battery pack according to claim 1,
wherein the at least one cover element is firmly adhesively bonded on the battery cell.

9. The battery pack according to claim 8,
wherein the at least one cover element is firmly adhesively bonded to the battery cell, by way of a pressure-sensitive adhesive, wherein the adhesive is partially or entirely an acrylate adhesive.

10. The battery pack according to claim 8,
wherein an adhesive force per unit area between the at least one cover element and the battery cell is greater than or equal to 0.1 N/m$^2$ and less than or equal to 1000 N/m$^2$.

11. The battery pack according to claim 5,
wherein the at least one cover element is self-adhesive.

12. The battery pack according to claim 1,
wherein the insulating lacquer is applied on the voltage-carrying surfaces by dipping of the voltage-carrying surfaces into the insulating lacquer.

13. The battery pack according to claim 2,
wherein the pack electronics unit comprises at least one of a measurement, power, user-interface, or transmission unit.

14. A work system, comprising:
a battery pack for supplying electrical drive power, the battery pack comprising:
  at least one battery cell, wherein the battery cell has at least one safety device, and the at least one safety device comprises a safety valve and at least one gas escape opening;
  voltage-carrying surfaces of the battery pack;
  an insulating lacquer, wherein the insulating lacquer firmly adheres on a first of the voltage-carrying surfaces; and
  at least one cover element, wherein the at least one cover element completely covers the safety device including the at least one gas escape opening such that no insulating lacquer adheres on and/or in the safety device, wherein
  the battery cell is an elongate, round cell,
  the safety device is arranged at a face side of the round cell,
  the at least one cover element has a ring shape,
  the battery cell has at least one cell contact, wherein the cell contact has the first voltage-carrying surface,
  the battery pack has at least one cell contactor, wherein the cell contactor has a second voltage-carrying surface, and,
  the cell contact and the cell contactor make contact through a free ring center of the at least one cover element; and
an electrically driven work appliance,
wherein the battery pack and the electrically driven work appliance are designed for electrical connection to one another for supplying the work appliance with the electrical drive power from the battery pack.

15. The battery pack according to claim 1,
wherein the at least one gas opening is arranged above the safety valve.

* * * * *